(12) United States Patent
Ohkubo

(10) Patent No.: US 6,978,693 B2
(45) Date of Patent: Dec. 27, 2005

(54) BALL SCREW

(75) Inventor: Tsutomu Ohkubo, Gunma (JP)

(73) Assignee: NSK Ltd., Tokyo (JP)

( * ) Notice: Subject to any disclaimer, the term of this patent is extended or adjusted under 35 U.S.C. 154(b) by 53 days.

(21) Appl. No.: 10/233,425

(22) Filed: Sep. 4, 2002

(65) Prior Publication Data
US 2003/0047019 A1    Mar. 13, 2003

(30) Foreign Application Priority Data
Sep. 5, 2001   (JP)   ................ P. 2001-268360

(51) Int. Cl.$^7$ .............................. F16H 1/18; F16H 1/20
(52) U.S. Cl. ...................... 74/424.87; 74/424.75; 74/424.81; 74/424.82
(58) Field of Search .................... 74/424.87, 424.75, 74/424.81, 424.82, 424.86

(56) References Cited

U.S. PATENT DOCUMENTS

| | | | | |
|---|---|---|---|---|
| 2,227,111 A | * | 12/1940 | Sturm | 254/98 |
| 2,783,656 A | * | 3/1957 | Fisher | 74/424.87 |
| 2,995,948 A | * | 8/1961 | Galonska et al. | 74/424.87 |
| 4,604,911 A | * | 8/1986 | Teramachi | 74/424.87 |
| 5,142,929 A | * | 9/1992 | Simpson, III | 74/424.87 |
| 5,303,607 A | * | 4/1994 | Katahira | 74/424.87 |
| 5,974,908 A | * | 11/1999 | Shirai et al. | 74/424.87 |
| 5,988,007 A | * | 11/1999 | Nishimura | 74/424.87 |
| 6,282,971 B1 | * | 9/2001 | Shirai et al. | 74/424.87 |
| 6,450,055 B1 | * | 9/2002 | Sekiya et al. | 74/424.87 |

FOREIGN PATENT DOCUMENTS

| | | |
|---|---|---|
| DE | 26 27 025 A1 | 12/1977 |
| DE | 199 25 040 A1 | 12/1999 |
| DE | 100 52 204 A1 | 7/2001 |
| JP | 2000-118359 | 1/2000 |

* cited by examiner

Primary Examiner—Thomas R. Hannon
Assistant Examiner—Colby Hansen
(74) Attorney, Agent, or Firm—Sughrue Mion, PLLC

(57) ABSTRACT

The invention is a ball screw, comprising: a shaft having a spiral-shaped shaft; a nut having a spiral-shaped nut ball groove and screwed with the shaft via a plurality of balls; and a ball circulation passage for raking the plurality of balls at one end of the ball rolling, wherein an end part of the ball circulation passage is connected to one end part of the ball rolling passage in such a manner that: a gap $\Delta t$ formed between a ball contacting part of the nut ball groove contacted with the ball and an inner circumferential surface of the end part of the ball circulation passage is set 0.2 mm or less; and a change of angle in a ball rolling direction is 10° or less, the change caused by raking the ball from the ball rolling passage to the ball circulation passage.

4 Claims, 6 Drawing Sheets

PRIOR ART

BALL SCREW

BACKGROUND OF THE INVENTION

The present invention relates to a ball screw less to cause breakage or noises, and in particular, to a ball screw of large lead suitably used at high speed sending and high speed rotation.

Machine tools or various kinds of devices have recently been demanded to be worked at high speed, and in company therewith, ball screws used to them have also progressed to the high speed.

For turning to the high speed, there is a large lead, but in a ball screw of the large lead, a forgoing return tube system has been difficult to smoothly rake balls into a return tube placed at upper part of the balls.

This fact will be explained referring to FIG. 6. The same is a view where a shaft 61 of an 20 mm axis diameter and a ball screw having a 40 mm lead is seen from a side of the return tube positioned in front with respect to the drawn paper of FIG. 6. In this ball screw, the return tube (not shown) is arranged such that a rake angle of the ball 62 is 0°. That is, the end part of the return tube (a part having an introducing mouth of the ball 62) is arranged such that the ball 62 coincides with a tangent of the shaft 61 in a raked position.

Thus, if raking the balls 62 placed in the raked position into the return tube, since the balls 62 interfere with a slashed part (see FIG. 6) of a land of the shaft 61, operationability of the ball screw is worsened, or abrasion of the ball or breakage in the land happen.

Therefore, for dissolving inconveniences as mentioned above in the present ball screw of the large lead, the return tube is arranged with taking a large rake angle (that is, the return tube is arranged such that an angle exists between the end part of the return tube and the tangent of the shaft at the raked position) so as to prevent occurrence of said interference.

However, if the return tube is arranged with taking the large rake angle, a change of angle is large in the rolling direction when the balls are raked into the return tube from a raceway of the balls. Then, a force added by the balls colliding to a tang projected at the end of the return tube for raking the balls becomes large, so that the tang is easily broken, and strength in the tang obstructs progression toward the high speed (faculty for turning to the high speed rotation).

Further, if the change of angle is large, the force is made large by the balls colliding to the shaft groove or nut ball groove of the shaft or the land, and another problem is present that the shaft groove of the shaft is easily spoiled.

On the other hand, JP-A-2000-18359 discloses such a ball screw which is not furnished with a tang at the end of the return tube for causing the balls to collide to and raking them into the return tube. Since this ball screw is furnished with a cut section gradually becoming narrower in width at the end of the return tube, the balls are slowly guided to an inner part of the return tube, while being guided by both sides of the cut section.

However, unless forming the cut section in precise shape, there is possibility that the ball screw cannot rake the balls, or the cut section is caused with a bias abrasion in edge parts.

For more raking the balls from the cut section, the shaft groove of the shaft should be shallow, but a shallow nut ball groove is not probably responsible to large load.

Further, in the case of the ball screw of the large lead, it is difficult to form the cut section in precise shape, and a problem is assumed to appear also in cost.

On the other hand, in the nowadays ball screw, a design is generally made on the ball raking part with reference to the path where a center of the ball passes. However, a conventional designing way has tendencies that the change of angle is large in the ball rolling direction when the balls are raked from the ball raceway into the return tube, or a gap (a difference in level) is large between the surface of the nut ball groove and the inner face of the end of the return tube.

In case the ball screw is served at high speed, the balls are rotated while being urged to the surface of the nut ball groove owing to a centrifugal force. Therefore a problem occurs when the balls pass the part of raking the balls, large noises are generated owing to the change of angle or the difference in level.

SUMMARY OF THE INVENTION

It is accordingly an object of the invention to provide a ball screw of large lead having dissolved the problem as mentioned above and involved with the prior ball screw, and less to cause breakage or noises.

For solving the above mentioned problem, the invention has the following structure. That is, the ball screw according to the invention comprises: a shaft having a spiral-shaped shaft groove in an outer circumferential surface thereof; a nut having a spiral-shaped nut ball groove corresponding to the shaft groove in an inner circumferential surface thereof and screwed with the shaft via a plurality of balls, the plurality of balls rotatably charged in a spiral-shaped ball rolling passage defined between the nut ball groove and the shaft groove; and, a ball circulation passage for raking the plurality of balls at one end of the ball rolling passage and sending to the other end thereof, wherein an end part of the ball circulation passage is connected to one end part of the ball rolling passage in such a manner that: a gap $\Delta t$ formed between a ball contacting part of the nut ball groove contacted with the ball and an inner circumferential surface of the end part of the ball circulation passage is set 0.2 mm or less; and a change of angle in a ball rolling direction is 10° or less, the change being caused by raking the ball from the ball rolling passage to the ball circulation passage.

By the way, the change of angle may be termed into an angle defined by the tangent at one end of the ball rolling passage of a curve including the center of many balls and the end of the ball circulation passage.

With this structure, since the gap (a difference in level) $\Delta t$ and the change of angle are small, though the ball screw is a ball screw of large lead and served at high speed sending and high speed rotation, the ball screw is difficult to cause breakage or noises.

In case the gap $\Delta t$ is more than 0.2 mm, noises during serving are probably large. In case the change of angle is more than 10°, the ball screw (the shaft groove or nut ball groove or the ball circulation passage) is ready for breakage, and noises are easily issued when using.

For making these problems less to occur, the end part of the ball circulation passage is preferably arranged along the lead angle direction of the balls.

The inner diameter dt of the ball circulation passage and the rake angle α of the ball are determined to satisfy the following formula:

$$|\Delta t - \Delta t'| < 0.2;$$

$$\Delta t = (dt - Dw)/2; \text{ and}$$

$$\Delta t' = BCD \cdot (1 - \cos \alpha)/2,$$

herein, Δt' is a deviation of the gap Δt caused by the rake angle α, BCD is the ball pitch diameter of the ball screw, and Dw is the ball diameter (see the schematic views of FIGS. 1A and 1B).

In case the inner diameter dt of the ball circulation passage and the rake angle α of the ball are set such that |Δt−Δt'| is 0.2 or more, the ball screw is easy to make breakage or noises.

As to the ball screw of FIG. 1A, the ball circulation passage is composed of the return tube only, and the balls are directly moved from the ball rolling passage to the return tube. But as seen in FIG. 1B, such a screw is also sufficient where the ball circulation passage is composed of a hole formed in the nut and the return tube connected to this hole. In this ball screw, the ball is raked from the ball rolling passage and moved to the connecting return tube.

The ball circulation passage in FIGS. 1A and 1B is arranged at the position when the rake angle α is 10°. If the rake angle α is 10°, a value of the gap Δt can be made smaller than the case when the rake angle α is 0°.

DETAILED DESCRIPTION OF THE PREFERRED EMBODIMENTS

Figure 1A:
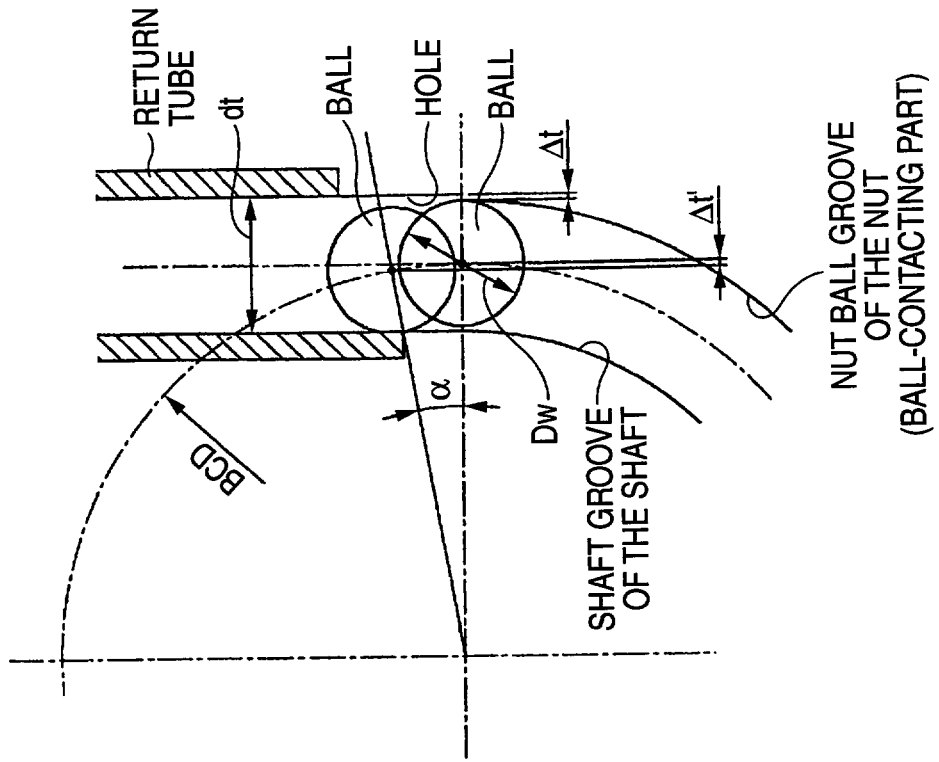
FIGS. 1A and 1B are schematic views for explaining the ball screws of the invention.
Figure 1B:
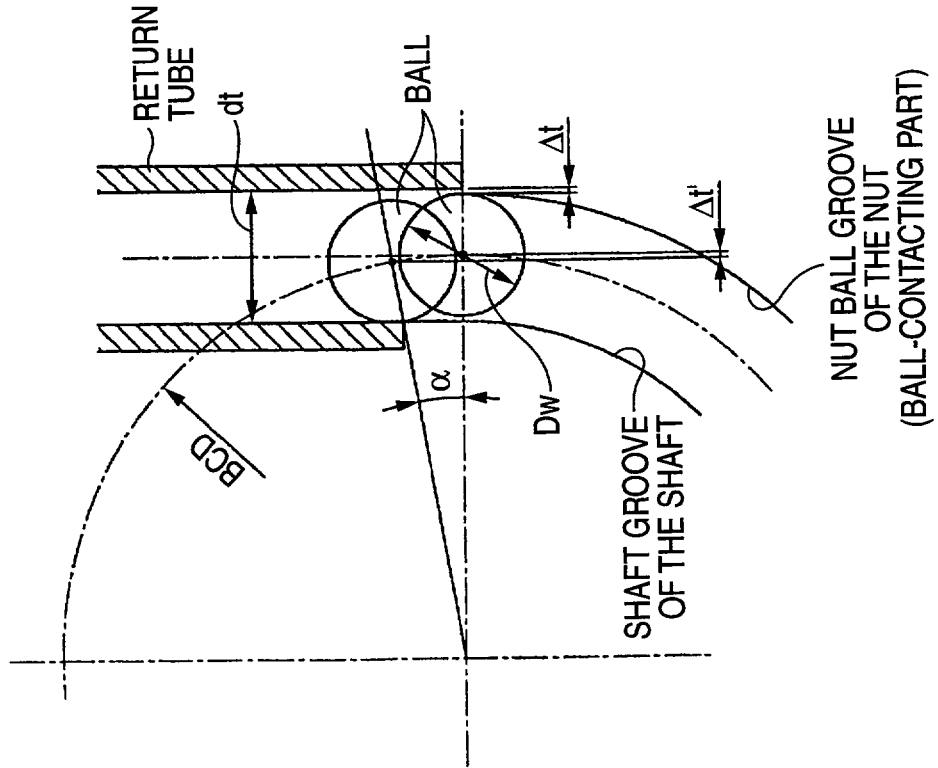
Figure 2:
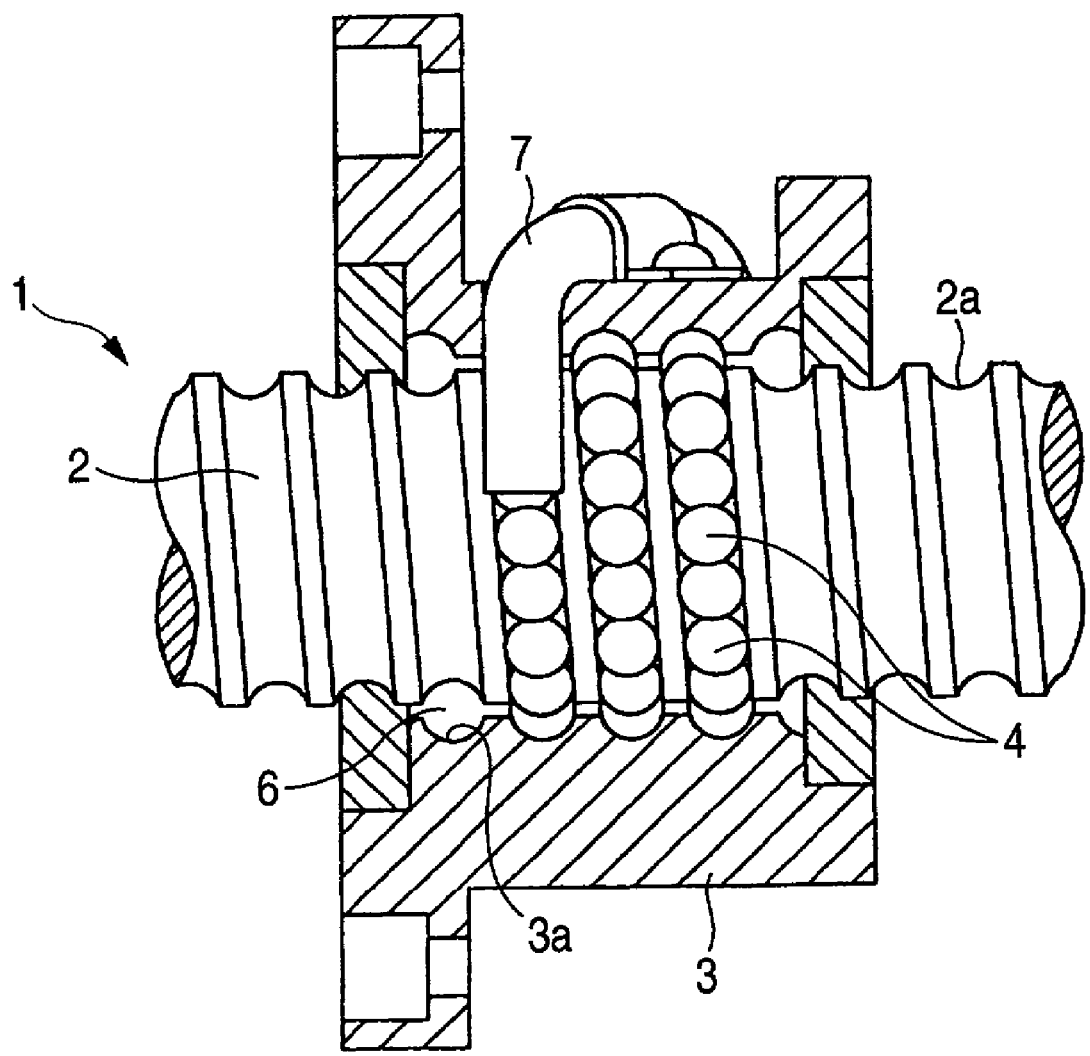
FIG. 2 is a cross sectional view for explaining the ball screws of the invention.
Figure 3A:
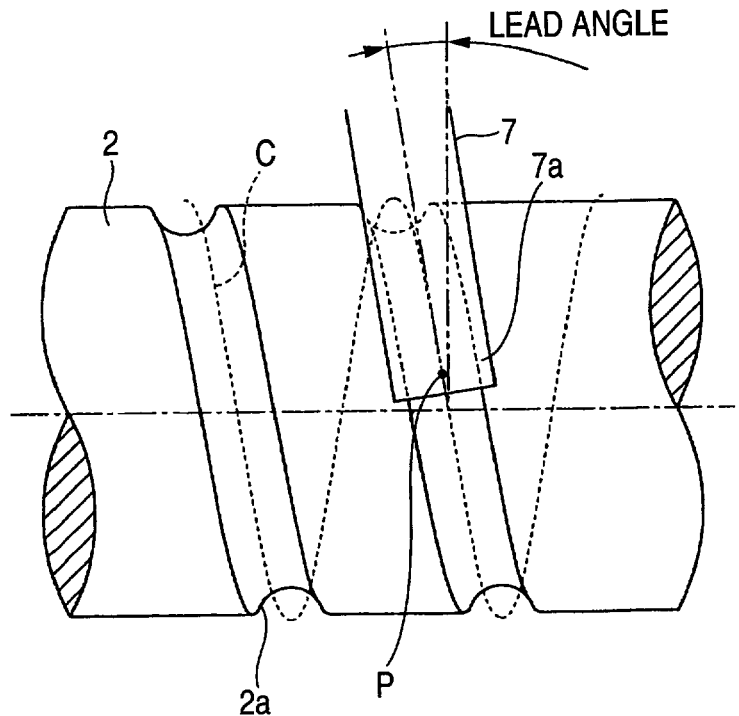
FIG. 3A is a side view showing an enlarged elementary part omitting the nut and the balls in the ball screw of FIG. 2.
Figure 3B:
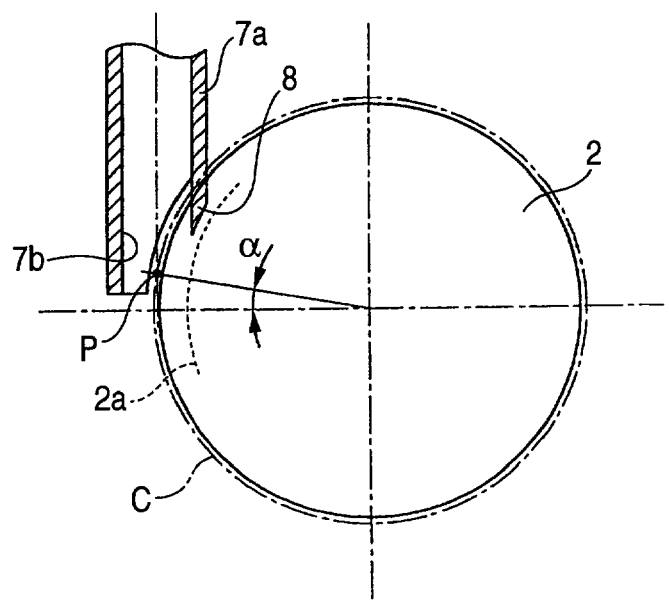
FIG. 3B is a front view seen from the axial direction of FIG. 3A.

Explanation will be made to a mode for carrying out the ball screw according to the invention with reference to the attached drawings. FIG. 2 is a cross sectional view showing one of embodiments of the ball screw. FIG. 3A is a side view showing an enlarged elementary part omitting the nut and the balls in the ball screw, and FIG. 3B is a front view seen from the axial direction of FIG. 3A.

The ball screw 1 (axial diameter: 40 mm, lead: 20 mm, ball pitch diameter BCD of the ball screw 1: 41 mm, diameter Dw of the ball 4: 6.35 mm, and inner diameter dt of the return tube 7: 6.9 mm) comprises: the shaft 2 having, in an outer circumferential surface thereof, the spiral-shaped shaft groove 2a which has arc-shape in cross sectional, the cylindrical nut 3 having, in an inner circumferential surface thereof, another spiral-shaped nut ball groove 3a which has arc-shape in cross sectional opposite to said shaft groove 2a of the shaft 2, and being screwed with the shaft 2, and a plurality of balls 4 rotatably charged in the spiral-shaped ball rolling passage 6 which is substantially circular in cross section, and defined between the shaft groove 2a of the shaft 2 and the nut ball groove 3a of the nut 3.

In addition, the nut 3 is furnished with the return tube 7 substantially bent in square, so that the balls 4 within the ball rolling passage 6 pass and circulate the return tube 7. The ball 4 rolls and moves within the ball rolling passage 6, goes round the shaft 2 several times, and is raked at one end P of the ball rolling passage 6 into one end 7a of the return tube 7. At this time, the ball 4 collides to the tang 8 projected at an end 7a of the return tube 7, whereby the ball 4 is raked into the return tube 7. The raked ball 4 passes through the return tube 7 and is returned from the other end of the return tube 7 to the other end of the ball rolling passage 6.

The nut 3 screwed to the shaft 2 via the balls 4 and the shaft 2 carry out relative spiral movement through rolling of a plurality of balls 4, so that the shaft 2 and the nut 3 relatively move in the axial direction.

In this ball screw 1, the rake angle α of the ball 4 is set to be about 10°. Further, seeing from a direction defining a right angle with the axis as in FIG. 3A, the end part 7a of the return tube 7 is arranged following (coinciding with the lead angle) a curve C (the shaft groove 2a) including the center of the ball 4.

When the ball 4 is raked from the ball rolling passage 6 into the return tube 7, the change of angle is nearly 0° in the rolling direction in the lead angle of the ball 4. Being the angle nearly 0°, even if the ball screw is a ball screw of large lead, and is served at high speed sending and high speed rotation, breakage or noises are difficult to occur in the tang 8 of the return tube 7.

The gap Δt is 0.2 mm or less between a bottom being the ball contacting part of the nut ball groove 3a of the nut 3 and the inner circumferential surface 7b at the end part 7a of the return tube 7. Since the gap Δt is small as 0.2 mm or less, in case the balls 4 pass the part having this gap Δt, generated noises are small, and accordingly, sound when using the ball screw 1 is small.

Furthermore, the ball pitch diameter BCD of the ball screw 1, the diameter Dw of the ball 4, the inner diameter dt of the return tube 7, and the rake angle α of the ball 4 have the values as above mentioned, and thus |Δt−Δt'| is less than 0.2.

The cross sectional shapes of both shaft and nut ball grooves 2a, 3a may be Gothic arch, that is, substantially V-shaped by combining arches which have different centers of curvature respectively. In the above ball screw 1, since the shaft and nut ball grooves 2a, 3a are arch in cross section, the balls 4 contact the bottoms of the shaft and nut ball grooves 2a, 3a. But in case the cross sectional shapes of both shaft and nut ball grooves 2a, 3a may be Gothic arch, the balls 4 do not contact the bottoms of the shaft and nut ball grooves 2a, 3a but contact sides thereof. In such a case, the gap Δt is 0.2 mm or less between the ball 4 contacting the nut ball groove 3a of the nut 3 and the inner circumferential surface 7b of the end 7a of the return tube 7.

In the present embodiment, the rake angle α of the ball 4 is appropriately determined so that the gap Δt is 0.2 mm or less, but the same effect may be brought about in a case of that the gap Δt is 0.2 mm or less, if the nut 3 is performed with a crowning process on the nut ball groove 3a, and a diameter of the nut ball groove 3a in the vicinity of the position raking the ball 4 (one end P of the ball rolling passage 6) is stepwise made larger.

Since the ball 4 is urged to the nut ball groove 3a of the nut 3 by centrifugal force at high speed rotation and rotates, when the ball 4 is raked by the tang 8, large force is not loaded to the tang 8. Therefore, if the tang 8 has strength to a certain degree, no matter occurs, and qualities and shapes are not largely limited and also advantageous in cost. The tang plays roles of raking the balls 4 at low speed rotation, and of assisting the rake of the balls 4 at high speed rotation.

Further, since the return tube 7 is arranged correspondingly to the lead angle, interference between the ball 4 and the shaft groove 2a is moderated, so that the width of the tang is made large.

The change of angle and the gap Δt are small in the ball 4 raking position (one end P of the ball rolling passage 6), and if using a retaining piece (a resin-made retainer interposed between the balls so that the balls do not compete one another), the retaining piece is difficult to interfere with other members in the vicinity of ball raking position. Thus, an effect of using the retaining piece may be brought about.

For attaching the return tube 7 to the nut 3 under a condition where the end part 7a is oblique in the axial direction, it is necessary to make oblong a hole formed in the nut 3 for inserting the return tube 7, or use a return tube 7 of such a type dividing into 2 parts or more.

As to the ball screw 1 as mentioned above and a conventionally standard ball screw, explanation will be made to results of evaluating noises when driving.

Figure 7A:
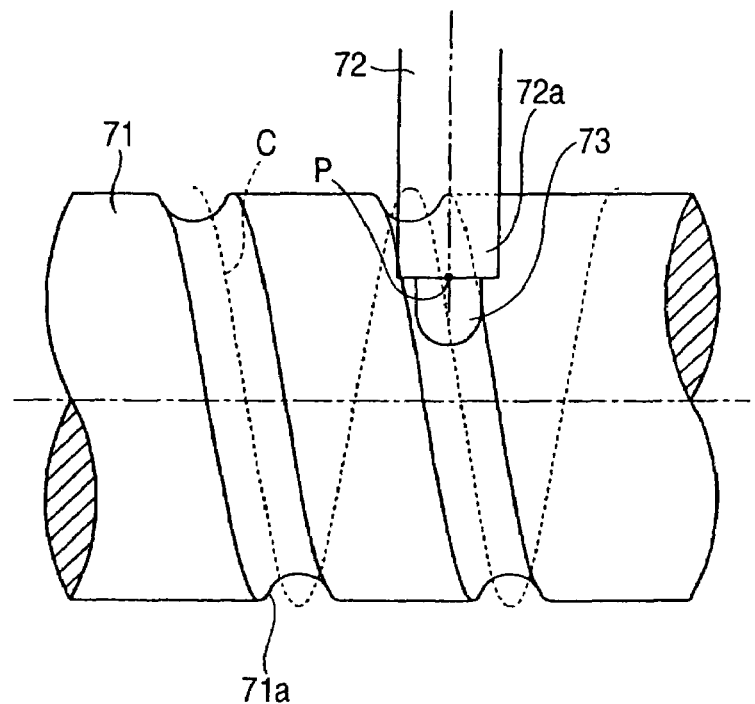
FIGS. 7A and 7B are views for explaining the structure of the conventionally standard ball screw.
Figure 7B:
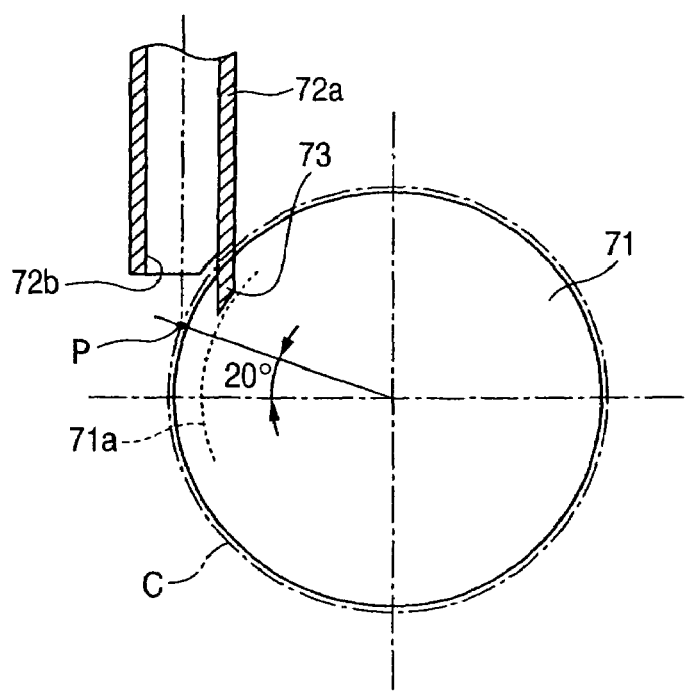

FIGS. 7A and 7B are views for explaining structures of the conventionally standard ball screw, and FIG. 7A is a side view showing only the shaft and the return tube, omitting the nut and the balls, while FIG. 7B is a front view seeing FIG. 7A in the axial direction.

In the conventionally standard ball screw, the difference in level is more than 0.2 mm between the bottom of the nut ball groove of a nut (not shown) and the inner circumferential surface 72b of the end part 72a of the return tube 72. In addition, the rake angle of the ball is set to be about 20° (that is, an angle defined between the tangent at one end P of a curve C including the center of the ball and the end part 72a of the return tube 72, when seeing from the axial direction as in FIG. 7B). In addition, when seeing from a direction defining a right angle with the axis as in FIG. 7A, the end part 72a of the return tube 72 is arranged defining a right angle with respect to the axial direction (not agreeing with the lead angle). Other structures than these regards are similar to those of the above mentioned ball screw 1.

These two ball screws are rotated at various rotational speeds, noises caused at that time were measured. Results are shown in a graph of FIG. 4 where an axis of ordinate shows noise levels (dB(A)), while an axis of abscissa shows Dw·dm·n. Herein, Dw is a diameter of the balls, dm is a ball pitch diameter (BCD) of the ball screw, and n is the rotation speed of the ball screw.

Figure 4:
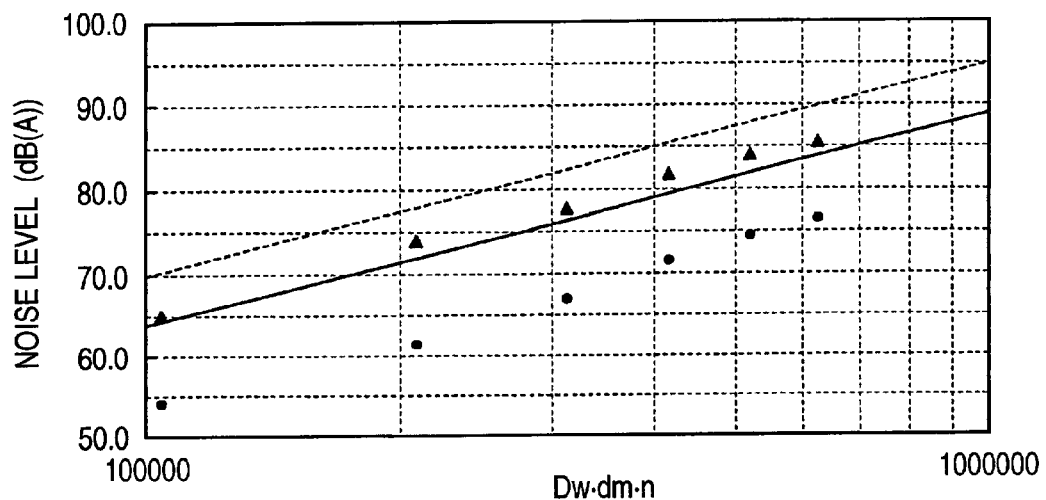
FIG. 4 is a graph for explaining results of evaluating noises of the ball screw at high speed rotation.

● in the graph of FIG. 4 are measured values of the ball screw 1 of this embodiment, ▲ are measured values of the conventionally standard ball screw of FIGS. 7A and 7B. For reference, average values (solid line) and maximum values (dotted line) of the whole ball screws made by NSK Ltd. are shown together.

As seen from the graph of FIG. 4, the ball screw of the present embodiment issues low noises as 10 dB(A) in comparison with the conventionally standard ball screw.

Next, consideration will be paid to these two ball screws in the high speed rotating faculties and the lives. As mentioned above, high speed limitation of the ball screw intensively depends on strength around the tang of the return tube. Comparing these two ball screws about conditions in the vicinity of the tang after the high rotation tests, the ball screw 1 of the present embodiment was confirmed to be less abrasion and collision in comparison with the conventionally standard ball screw. Accordingly, the present embodied ball screw 1 may be turned to higher speed.

It is supposed from the front end of the tang or the condition (colliding condition) of the inner circumferential surface of the return tube 7 that, at high speed rotation, the ball rotates under the condition where the ball is urged to the side of the nut 3. It is assumed that if the ball rotates under the condition where the ball is urged to the side of the nut 3, the ball 4 scarcely collides to the shaft groove 2a of the side of the shaft 2. Therefore, when the ball screw 1 rotates at the high speed, abrasion of the ball 4 or breakage of the shaft groove 2a are difficult to occur, and accordingly, the ball screw has a long serving life.

The return tube 7 is arranged following the shaft groove or nut ball groove, so that interference between the return tube 7 and the land of the shaft groove or nut ball groove can be avoided. In short, balls of larger diameter may be served, and a net rated load is increased, resulting in the long serving life.

Next, explanation will be made to results of evaluating relation between the gap Δt and noises. In the above mentioned ball screw 1, as to the two kinds of ball screws of the gap Δt being 0.25 mm and the gap Δt being 0.2 mm or less made by carrying out the crowning process in the nut ball groove and stepwise making larger the diameter of the nut ball groove in the vicinity of the position of raking the balls, the rotations were made at various speeds and noises caused then were measured.

Figure 5:
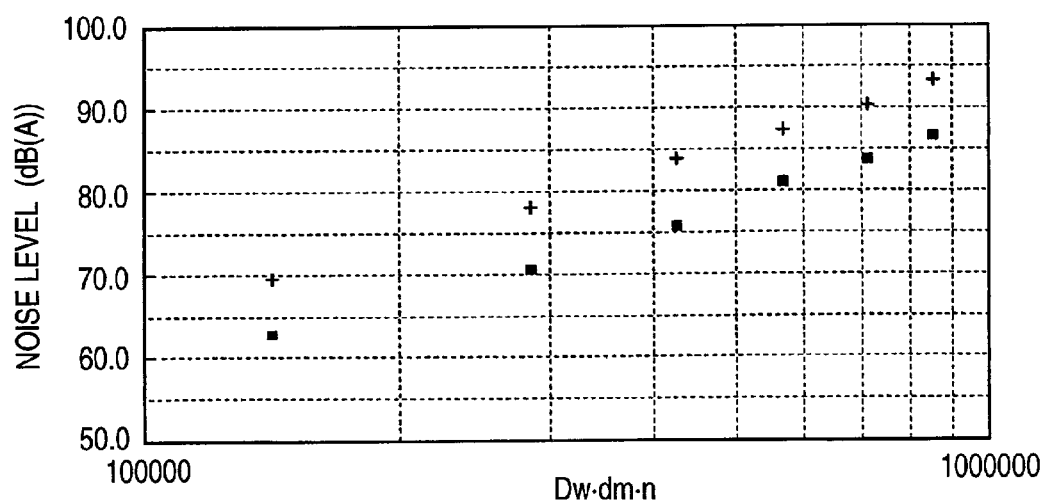
FIG. 5 is a graph for explaining results of evaluating noises of the ball screw at high speed rotation.
Figure 6:
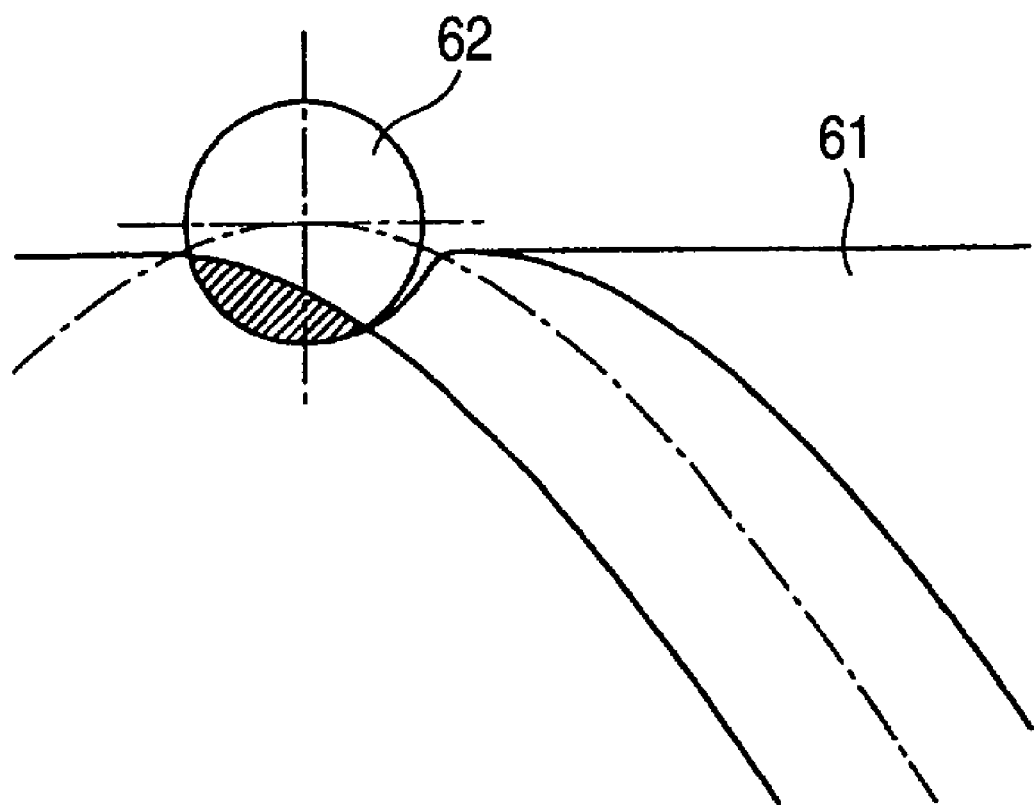
FIG. 6 is a view for explaining the structure of the conventional ball screw of large lead.

Results are shown in the graph of FIG. 5 where axes of ordinate and abscissa are the same as those of FIG. 4. ■ in the graph of FIG. 5 are measured values of the ball screw where the crowning process was carried out to defining the gap Δt being 0.2 mm or less, and + (plus marks) designate measured values of the ball screws without the crowning process and with the gap Δt being 0.25 mm.

As seen from the graph of FIG. 5, the small gap Δt is low noises around 7 to 8 dB(A).

It should be noted that the present embodiment is merely one example of the invention, and the invention is not limited to the present embodiment. For example, so far as each of dimensions of the ball screw 1 or shapes of the return tube 7 do not miss the object of the invention, modifications are appropriately available.

As mentioned above, the ball screw of the invention has the large lead, and is less to cause breakage or noises if used at high speed sending or high speed rotation.

What is claimed is:

1. A ball screw, comprising:
   a shaft having a spiral-shaped shaft groove in an outer circumferential surface thereof;
   a nut having a spiral-shaped nut ball groove corresponding to the shaft groove in an inner circumferential surface thereof and screwed with the shaft via a plurality of balls, the plurality of balls rotatably charged in a spiral-shaped ball rolling passage defined between the nut ball groove and the shaft groove; and,
   a ball circulation passage for raking the plurality of balls at one end of the ball rolling passage and sending to the other end thereof,
   wherein an end part of the ball circulation passage is connected to one end part of the ball rolling passage in such a manner that:
   a gap Δt formed between a ball contacting part of the nut ball groove contacted with the ball and an inner circumferential surface of the end part of the ball circulation passage is set 0.2 mm or less; and a change of angle in a ball rolling direction is 10° or less, the change being caused by raking the ball from the ball rolling passage to the ball circulation passage.

2. The ball screw as set forth in claim 1, wherein the end part of the ball circulation passage is arranged along a lead angle direction of the balls.

3. The ball screw as set forth in claim 2, wherein an inner diameter dt of the ball circulation passage and a rake angle α of the ball are determined to satisfy the following formula:

$|\Delta t - \Delta t'| < 0.2;$ $\Delta t = (dt - Dw)/2;$ and $\Delta t' = BCD \cdot (1 - \cos \alpha)/2,$ herein, $\Delta t'$ is a deviation of the gap $\Delta t$ caused by the rake angle α, BCD is the ball pitch diameter of the ball screw, and Dw is the ball diameter.

4. The ball screw as set forth in claim 1, wherein an inner diameter dt of the ball circulation passage and a rake angle α of the ball are determined to satisfy the following formula:

$|\Delta t - \Delta t'| < 0.2;$ $\Delta t = (dt - Dw)/2;$ and $\Delta t' = BCD \cdot (1 - \cos \alpha)/2,$ herein, $\Delta t'$ is a deviation of the gap $\Delta t$ caused by the rake angle α, BCD is the ball pitch diameter of the ball screw, and Dw is the ball diameter.

* * * * *